(No Model.) 3 Sheets—Sheet 1.

W. R. HINSDALE.
APPARATUS FOR TREATING SEWAGE.

No. 363,826. Patented May 31, 1887.

Attest:
L. Lee.
Henry J. Theberath.

Inventor.
William R. Hinsdale.
per Crane & Miller, Attys.

(No Model.) 3 Sheets—Sheet 2.

W. R. HINSDALE.
APPARATUS FOR TREATING SEWAGE.

No. 363,826. Patented May 31, 1887.

Attest:
L. Lee,
Henry J. Theberath.

Inventor:
William R. Hinsdale,
per Crane & Miller Att'ys.

(No Model.) 3 Sheets—Sheet 3.

W. R. HINSDALE.
APPARATUS FOR TREATING SEWAGE.

No. 363,826. Patented May 31, 1887.

Attest:
L. Lee.
Henry J. Miller

Inventor.
Wm. R. Hinsdale
per Crane & Miller, Attys.

UNITED STATES PATENT OFFICE.

WILLIAM R. HINSDALE, OF BROOKLYN, NEW YORK.

APPARATUS FOR TREATING SEWAGE.

SPECIFICATION forming part of Letters Patent No. 363,826, dated May 31, 1887.

Application filed September 3, 1886. Serial No. 212,635. (No model.)

*To all whom it may concern:*

Be it known that I, WILLIAM R. HINSDALE, a citizen of the United States, residing at Brooklyn, Kings county, New York, have invented certain new and useful Improvements in Treatment of Sewage, fully described and represented in the following specification, and the accompanying drawings forming a part of the same.
This invention relates to a process in which the sludge or solid constituents of sewage are precipitated from the more fluid parts; and it consists, partly, in certain apparatus, hereinafter described and claimed, for rapidly drying the sludge, and thereby fitting it for immediate transportation and for convenient use as a fertilizer, and partly in means for aerating the clarified fluid to deprive it of its free ammonia and other organic products.
The apparatus for drying the sludge consists, partly, in a leaching or straining tank, partly in means for conveying the sludge from such tank, and partly in a drier-roll for pressing the water from the sludge when it has been partially dried in the leaching-tank.

Figure 2:
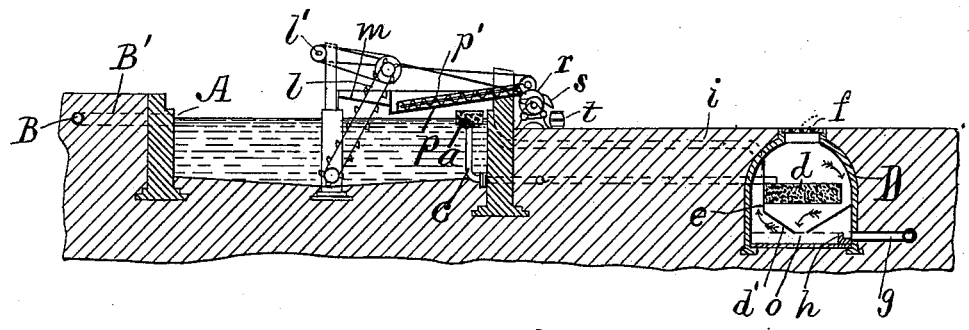
Figure 1:
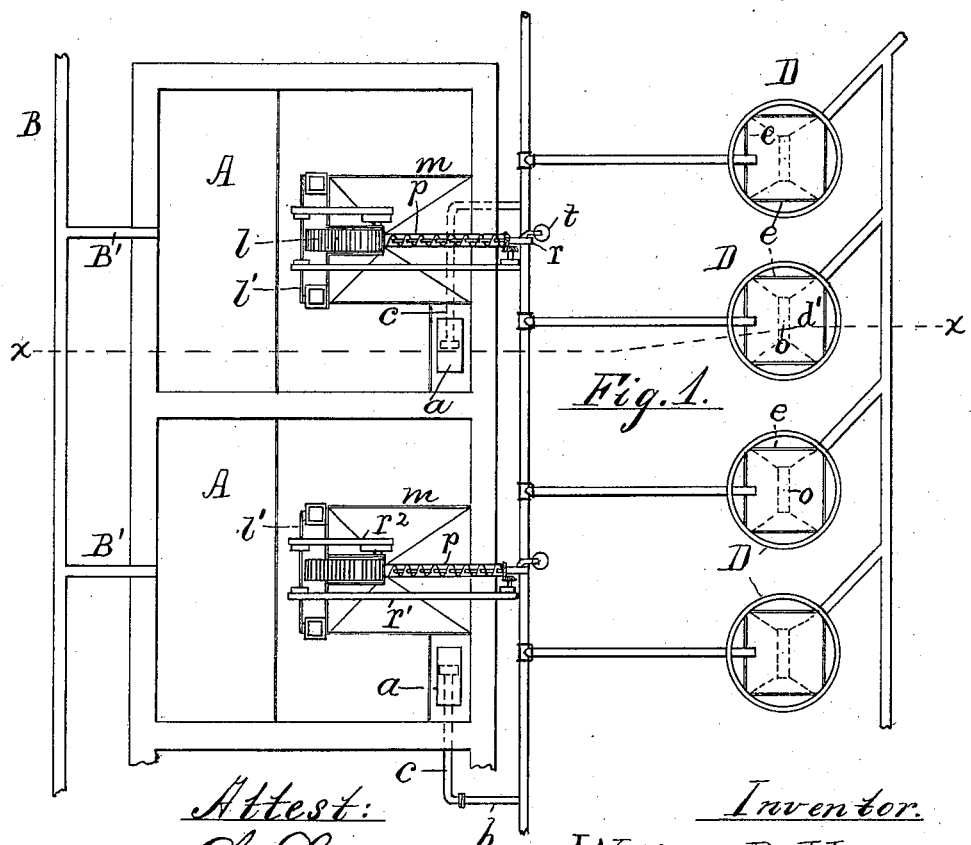
Figure 4:
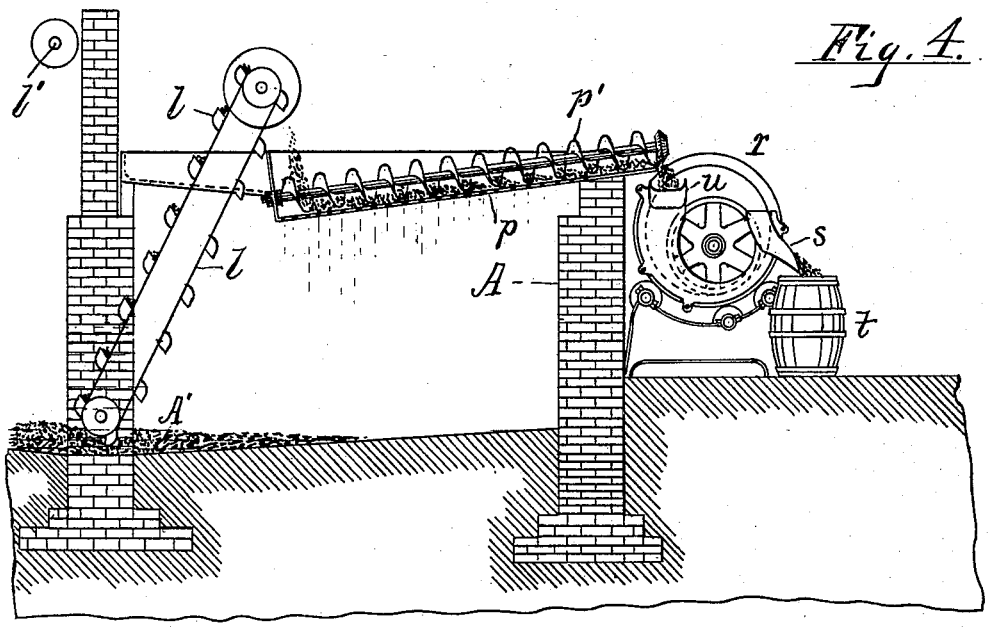
Figures 3, 5:
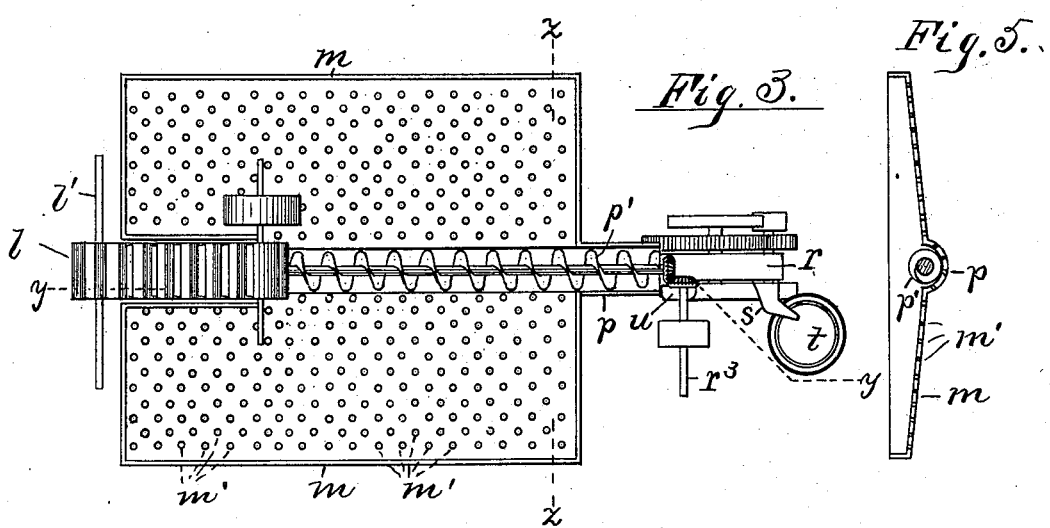
Figure 7:
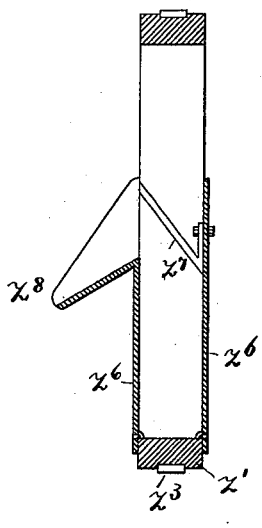
Figure 6:
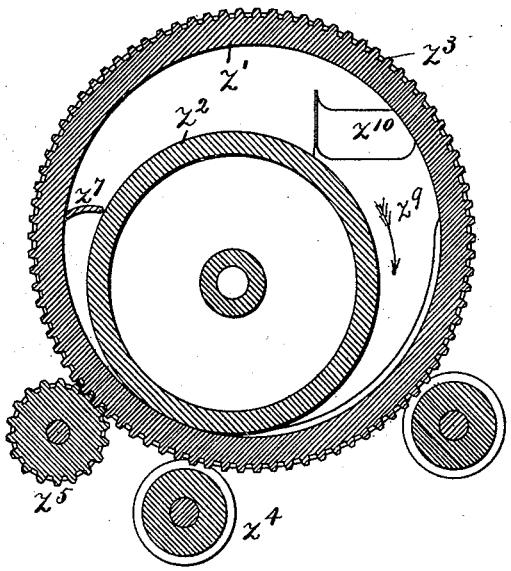

The apparatus for purifying the fluid constituents of the sewage consists in an aerating device adapted to operate upon the liquid when it is discharged from the settling-tanks.
In the drawings, Figure 1 is a plan of two settling-tanks provided with my improvements. Fig. 2 is a section of the same on line $x$ $x$ in Fig. 1. Fig. 3 is a plan of the desiccating apparatus upon a larger scale, and Fig. 4 is a transverse section of the same on line $y$ $y$ in Fig. 3. Fig. 5 is a section of the leaching-tank on line $z$ $z$ in Fig. 3. Fig. 6 is a vertical section of the desiccating-rolls upon a larger scale; and Fig. 7 is a vertical section through the axis of the shell, showing its casing, scraper, and discharge-spout.

A are the settling-tanks, and B the main sewage-pipe, connected therewith by branches B', and $a$ are floating filters connected to the upper ends of pipes $c$, which are swiveled at their lower ends to pipes $b$, which carry the liquor from the settling-tanks to aerators D. The aerator consists in a closed receptacle or pit situated chiefly below the bottom of the tank A, and provided upon three sides with an internal casing, $e$, containing a filter-bed, $d$. The filter-bed consists of coke or other suitable material sustained upon a perforated platform, and the casing is formed below the filter-bed with sloping sides $d'$, which terminate at a central opening, $o$, near the bottom of the pit.

The cover of the pit is formed with apertures $f$, and the casing is clear of the filter-bed at one side, so that air entering the holes $f$ may pass downward beside the filter-bed and beneath the same to the outlet $o$ at the bottom of the casing.

The bottom of the pit is furnished with a discharge-pipe, $g$, at one side, and a dam, $h$, is formed across the bottom, near such pipe, to retain the fluid at a level with the outlet $o$. An escape-pipe, $i$, is provided outside the casing, to discharge the air from the pit, and the aerator as thus constructed operates as follows:

The tanks A, which may be arranged in any number to suit the requirements of the sewage system, are alternately filled with the sewage matter, and the latter is charged with a suitable chemical precipitant.

When the precipitation of the solid matters is effected and the sludge has settled in the bottom of the tank, the floating filter $a$ is placed in operation, and the supernatant clarified liquor is drawn off to the aerator. It here falls upon the filter-bed $d$, and passes in a shower of small streams and drops upon the sloping bottom $d'$ of the casing $e$. The subdivision of the liquor by its passage through the filter-bed and the descent of the fluid through the air in the casing aerates the liquor in the most effectual manner, while its passage through the contracted aperture $o$ tends to carry the entangled air with it into the bottom of the pit, where the surplus gases are discharged from the pipe $i$, and the liquor, passing over the dam $h$, is discharged by the pipe $g$ to any suitable outlet.

The combined action of the precipitating operation and the aeration tends not only to clarify the sewage liquor, but to deprive it of offensive gases and noxious properties, so that it may be safely discharged into any stream of running water.

When the liquor is drawn from the tank A, the sludge which has settled in its bottom is lifted by an elevator, $l$, to the leaching-tank $m$, the bottom of which is provided with perforations $m'$ to drain away the greater part of its contained fluid.

The bottom of the leaching-tank is sloped from the sides toward the middle, and is formed with a trough, $p$, containing a worm-conveyer, $p'$, to discharge the strained sludge into the hopper of the desiccating-rolls $r$. The passage of the sludge through such rolls removes the greater part of the remaining moisture to such a degree that the matter may be thence discharged through a spout, $s$, directly into the barrels $t$, and thus be ready for immediate transportation. A motor-shaft, $l'$, is shown, to actuate the elevator-conveyer and rolls $r$, and such shaft may be rotated by any suitable power.

A thin coating of sawdust or straw, or of any fibrous or textile material, may be spread over the bottom of the leaching-tank, to permit the discharge of the fluid, and the solid matters are, when drained, shoveled into the trough $p$, and are thus delivered to the rolls in a much better condition for the application of pressure to remove more of the fluid. As such leaching operation is a very useful one in connection with any system of utilizing sewage, I do not limit myself to its use exclusively with the other appliances herein described.

As a matter of convenience, it is desirable to locate the leach-tank immediately over the settling-tank, so that the water percolating through the bottom may fall directly into the latter.

Fig. 4 shows the sludge in the bottom of tank A at A', with the water removed from the settling-tank, and the conveyer $p'$ and rolls $r$ in operation discharging the desiccated sludge into a barrel, $t$.

In Fig. 3 the sludge is omitted, to show the mechanism clearly, and the belts $r'$ and $r^2$, (shown in Figs. 1 and 2,) to drive the rolls and the elevator, are also omitted; and in Fig. 4 the gear and shaft $r^3$, used to drive the conveyer, are also omitted, to avoid concealing the hopper $u$ upon the rolls $r$. This hopper receives the sludge from the conveyer and delivers it between an external shell and an internal drum, arranged eccentric to one another and operating to feed the sludge downward and to discharge it upward above the contact-point of the drum with the shell.

The operation of the drum and shell which constitute the desiccating-rolls will be understood by reference to the section transverse to the rolls in Fig. 6. The means for driving the rolls is not shown herein, nor is their construction claimed herein, as I have made the same the subject of a separate application, No. 213,646, where the mechanism for actuating the rolls is fully shown.

In Fig. 4 the supporting frame or standard for the rolls is indicated, as well as the anti-friction wheels upon which the shell rotates, and the same is shown upon a larger scale in Fig. 6, where $z'$ is the shell, $z^2$ a drum mounted eccentrically within it, and constructed to press elastically upon the interior of the shell above the lowest point. $z^3$ are teeth upon the periphery of the shell at its middle; $z^4$ are anti-friction wheels sustaining the shell, and $z^5$ is a pinion rotated by any suitable means and meshing with the teeth $z^3$ to rotate the shell. Mechanism is also provided to rotate the drum in contact with the shell.

In Fig. 7 a stationary casing, $z^6$, is shown fitted to each end of the shell, and provided with a scraper, $z^7$, and discharge-spout $z^8$.

In Fig. 6 the casing is shown provided with a feeding-hopper, $z^{10}$. The drum and shell rotate in the direction of the arrow $z^9$, and the sludge, being fed between the drum and shell by the hopper $z^{10}$, is carried from the lowest part of the shell by the rotation of the latter, and after compression between the drum and shell is discharged still farther from the lowest point into the space provided with the scraper. During and after its compression the matter, being moved upward, is carried away from the liquid which is expressed by the pressure of the drum, and such matter is therefore carried to the scraper in as dry a condition as pressure can produce.

The scraper, as shown in Fig. 6, operates against the opposed surfaces of the shell and drum, to which the dry matter adheres, and being inclined, as shown in Fig. 7, discharges such matter into the spout $z^8$, by which it would be conducted into barrels or any suitable receptacle. By such construction the fluid matter which is expressed from the sludge may be discharged from the rolls without again wetting the dry product. This result is effected by the upward delivery, in this particular construction, by the contact of the drum with the shell above its lowest point, and its rotation away from the bottom of the shell, and such upward delivery is most desirable and important in pressing semi-fluid or partly-liquid matters, as they cannot be readily fed upward into a pair of rolls, and should not be delivered downward, lest the expressed fluid should flow in the same direction and prevent the separation of the solid matter therefrom.

My present invention consists, however, in the use of any suitable rolls for expressing the moisture from the sludge, whether the same be previously leached or not. In like manner I do not limit myself to the precise construction of the aerator that may be used, as the essential feature of my invention is the combination, with the plant for disposing of the solid matters, of the aerator for removing free ammonia and other elements from the clarified liquor by oxidation.

What I claim as my invention is—

1. In the treatment of sewage, the combination, with the settling-tank A, of a leaching-tank, $m$, arranged above the tank A, and having in its bottom perforations $m'$ to drain the fluid from the tank $m$ to the tank A, and an elevator adapted to lift the sludge from the bottom of the tank A to the tank m, as and for the purpose set forth.

2. In the treatment of sewage, the combination, with the settling-tank A, of a leaching-tank, m, arranged above the tank A, and having perforations m' to drain the fluid from the tank m to the tank A, a layer of pervious material—as straw or sawdust—applied over said perforations to prevent the finer parts of the sludge from passing through the perforations, and an elevator arranged and operated to lift the sludge from the tank A to the tank m, as and for the purpose set forth.

3. In the treatment of sewage, the combination, with a settling-tank, of a leaching-tank above the level of the same, an elevator to raise the sludge to the leaching-tank, desiccating-rolls to press the moisture from the sludge, and a conveyer in the leaching-tank to shift the sludge to the rolls, substantially as herein set forth.

4. In the treatment of sewage, the combination, with a settling-tank, of an aerator for oxidizing the clarified liquor, and pipes for conducting the liquor from the settling-tank to the aerator, substantially as shown and described.

5. In the treatment of sewage, an aerator provided with a filter-bed and with a casing adapted to mingle the liquor with air below the filter-bed, as and for the purpose set forth.

6. In the treatment of sewage, the combination of the following elements: a settling-tank, a leaching-tank, desiccating-rolls, and an aerator to oxidize the clarified liquor, the whole arranged and operating substantially as herein set forth.

In testimony whereof I have hereunto set my hand in the presence of two subscribing witnesses.

WILLIAM R. HINSDALE.

Witnesses:
 THOS. S. CRANE,
 HENRY J. THEBERATH.